Inventors
JAMES D. GREIG &
ALFRED J. BAILEY
BY
Tweedale & Gerhardt
Attorneys

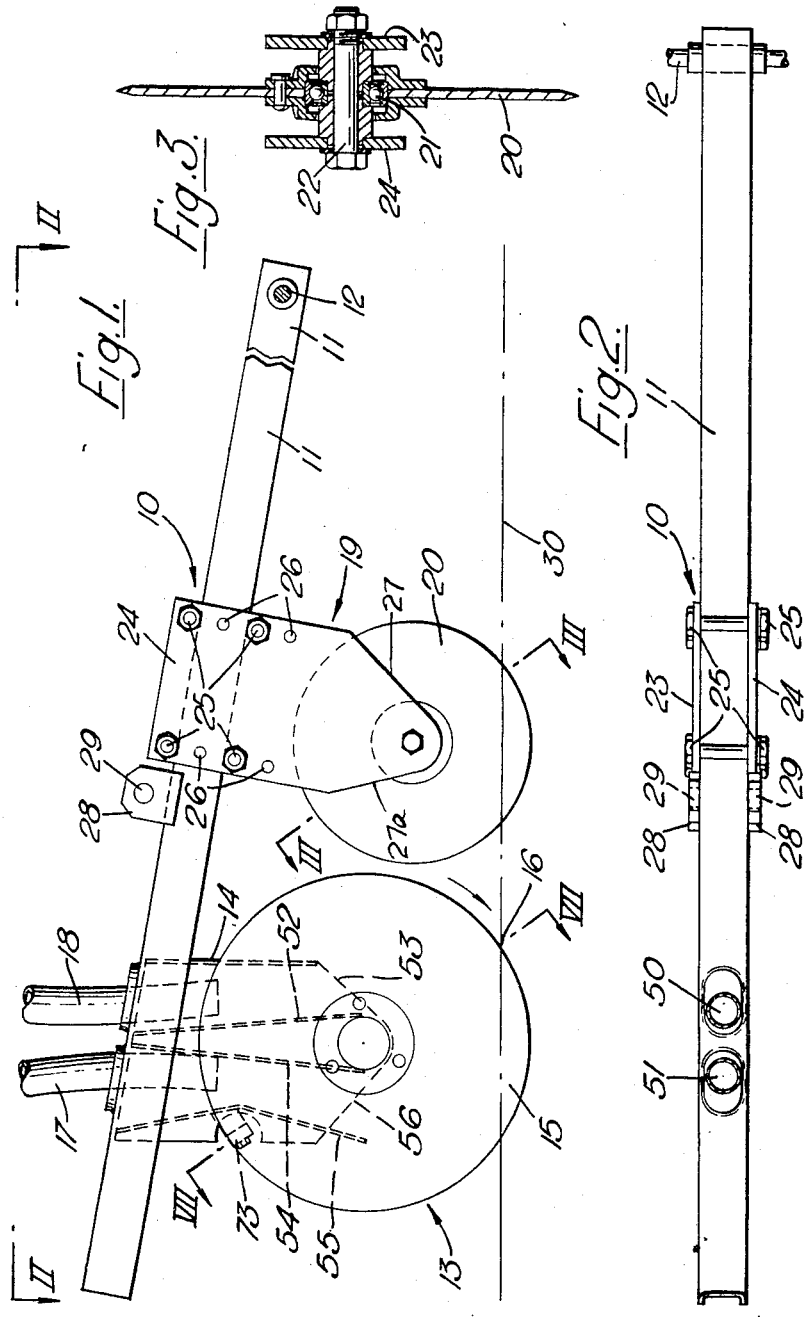

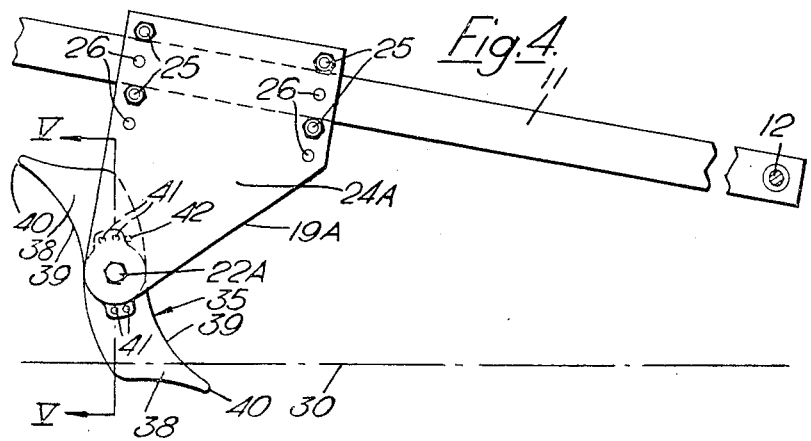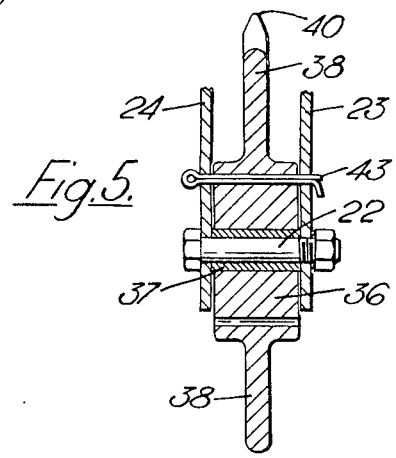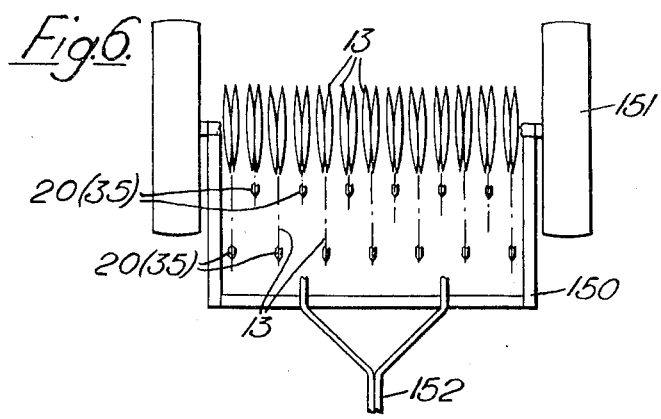

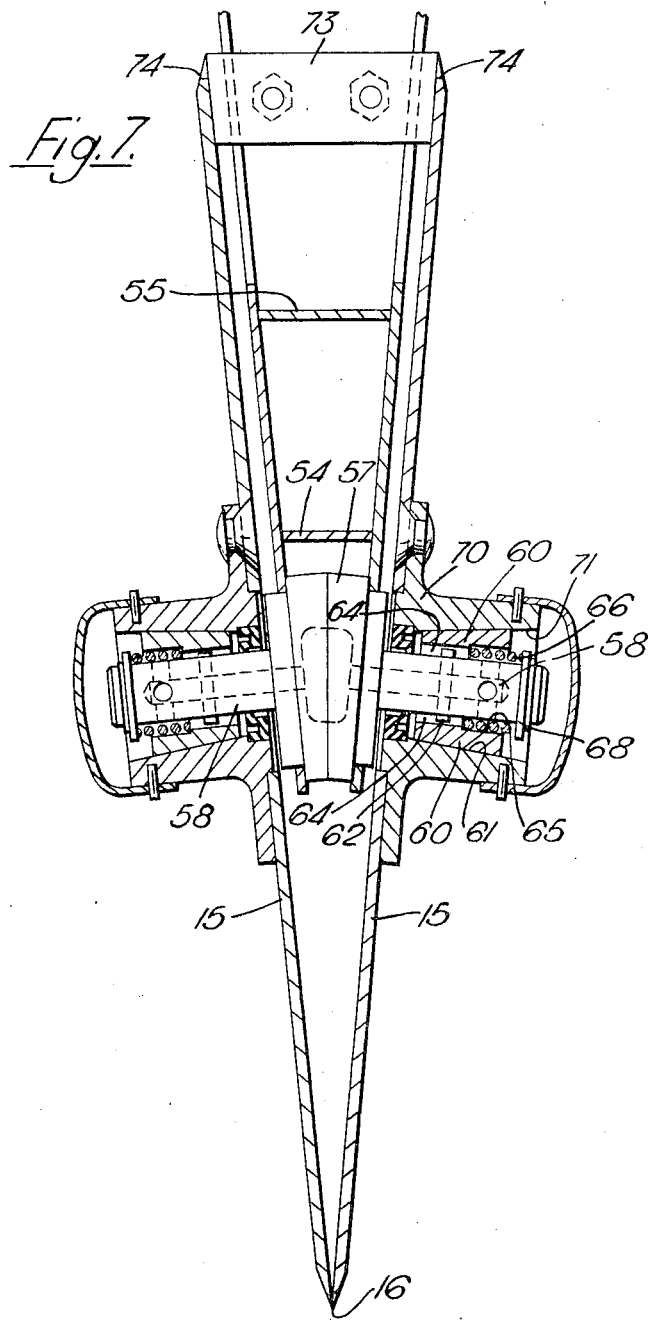

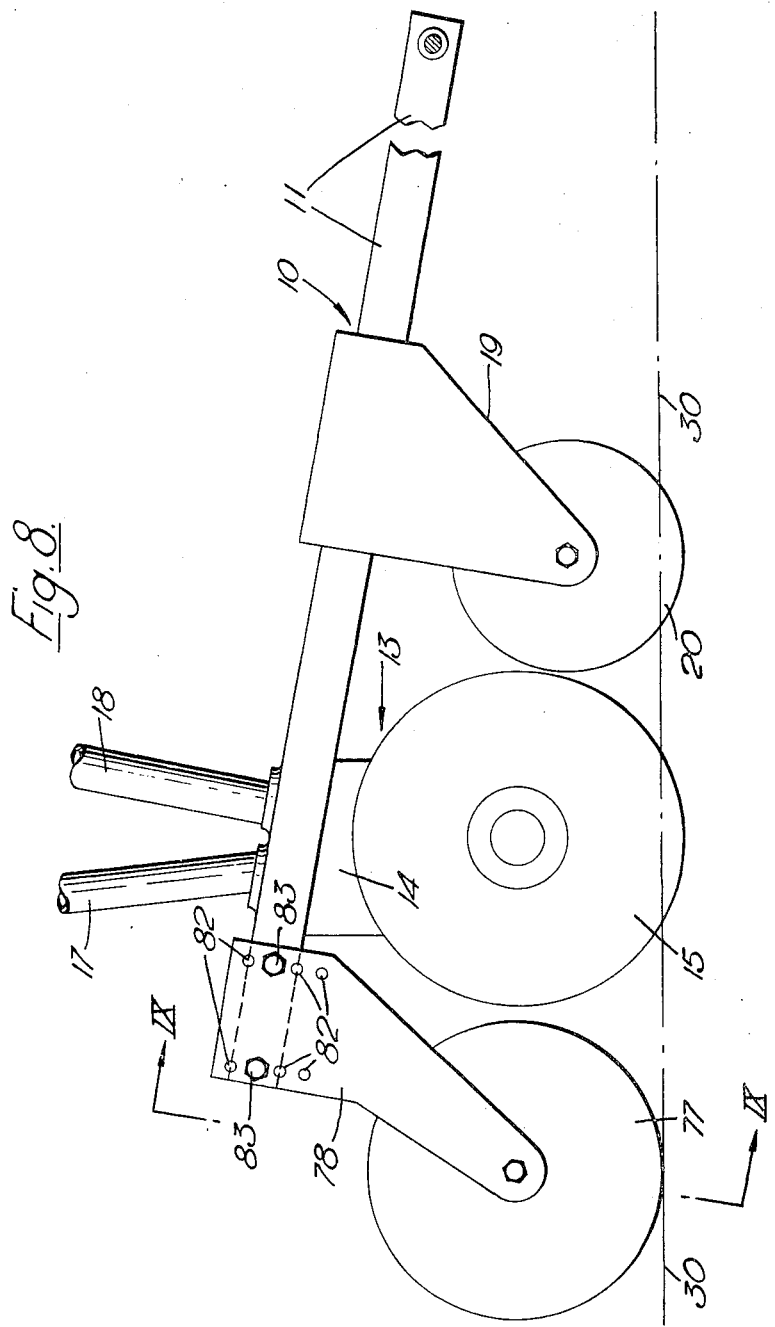

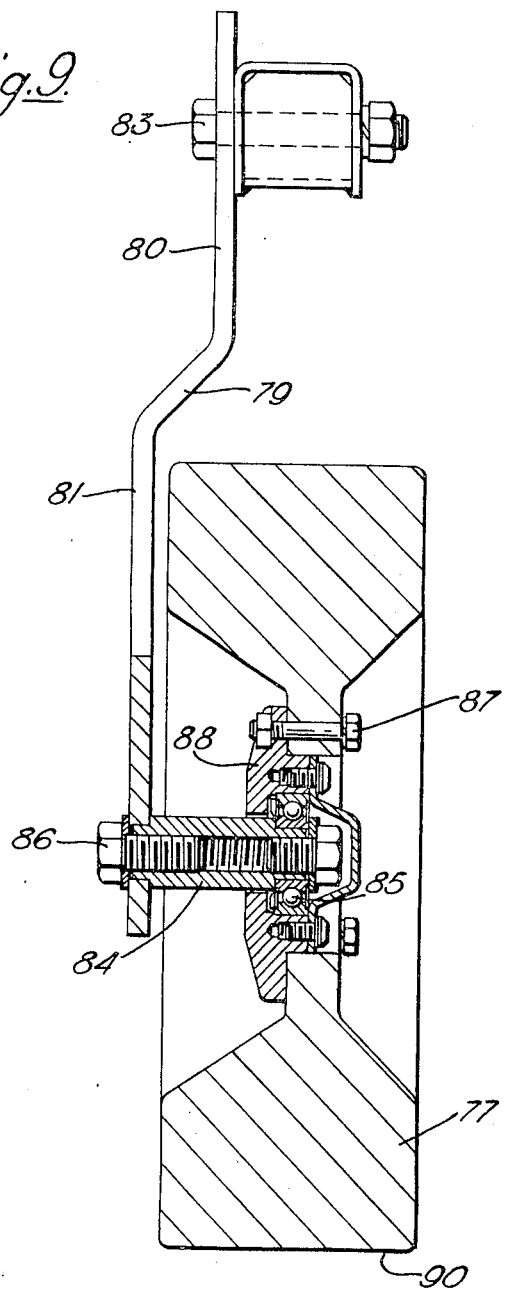

United States Patent Office 3,507,233
Patented Apr. 21, 1970

3,507,233
SEED DRILL
James D. Greig, Warwick, and Alfred J. Bailey, Berkswell Village, near Coventry, Great Britain, assignors to Massey-Ferguson Services N.V., Netherlands Antilles
Filed Sept. 8, 1966, Ser. No. 578,078
Claims priority, application Great Britain, Sept. 10, 1965, 38,838/65
Int. Cl. A01b 35/28; A01c 5/06
U.S. Cl. 111—85
10 Claims

ABSTRACT OF THE DISCLOSURE

A seed drill having a plurality of drag bars each of which may have a slit-forming device, a furrow opener, and a press wheel attached. The drag bars are pivotally attached to the drill frame at their forward end and extend up and to the rear from the pivot point. The slit-forming devices and press wheels can be clamped in any desired position along the length of the drag bars and are vertically adjustable relative to the drag bars.

---

This invention relates to seed drills of the type which in progress across the land form a furrow into which the seed is dropped.

Coulter assemblies of such drills, including drag bars carrying furrow openers, are normally designed to penetrate to a shallow depth in well cultivated land. With the use for seeding of a method, hereinafter referred to as "direct seeding" in which the ground is first sprayed to kill living plant growth and then directly seeded without further cultivation, penetration by the furrow openers is extremely difficult. Furthermore, since the killed plant growth, and in some instances stubble, remains on the top of the ground, trash can quickly build up around the coulters and cause a blockage.

It is an object of the present invention to provide in a seed drill a coulter assembly, which, while it may still be used in the conventional manner and is particularly useful in difficult conditions, obviates or mitigates the above problems when using the direct seeding method.

The invention is a seed drill having a coulter assembly and a drag bar which has a furrow opener mounted at its rear end and is pivotally connected at its front end to a frame of the drill, the drag bar extending rearwardly and upwardly relative to the direction of travel of the drill when the furrow opener is in operation.

Preferably, a means for forming a slit in the soil, such as a rotatable disc or a knife, mounted in a vertical plane is provided on the drag bar forwardly of the furrow opener. The slit forming means may be adjustable along the length of the drag bar and also vertically relative thereto.

A press or depth control wheel may also be mounted on the drag bar rearwardly of the furrow opener and this may be adjustable for height and or laterally relative to the drag bar.

The invention is also a furrow opener comprising a pair of discs rotatably mounted on mutually inclined axes and resilient means urging said discs towards each other.

Other objects, advantages and features of the invention will become apparent from the following description taken in connection with the accompanying drawings in which:

FIG. 1 is a side elevation of a coulter assembly according to the invention;

FIG. 2 is a plan view on the line II–II of FIG. 1;

FIG. 3 is a sectional view on the line III–III of FIG. 1 showing details of a slit forming disc;

FIG. 4 is a side elevation of slit forming means comprising a knife;

FIG. 5 is a section on the line V—V of FIG. 4;

FIG. 6 is a diagrammatic plan view of a seed drill including coulter assemblies according to the invention;

FIG. 7 is a sectional view of a furrow opener on the line VII—VII of FIG. 1;

FIG. 8 is a side elevation of a coulter assembly similar to that shown in FIG. 1, but with the addition of a press or depth wheel;

FIG. 9 is a sectional view of the press wheel taken on the line IX—IX of FIG. 8.

Figure 10:
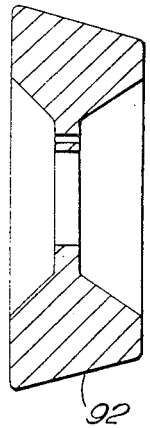
FIGS. 10–14 show various shapes of press wheels which may be used.

Referring to the drawings, FIGS. 1 and 2 show a coulter assembly 10 including a drag bar 11 pivotally mounted at its front end on a rod 12 which is supported on the frame of the drill and extends transversely to the direction of work.

A furrow opener 13 is rigidly attached to the rear end of the drag bar by a bracket 14. The furrow opener may be of any usual type, such for instance as a single disc coulter or hoe type. It is preferred, however, to use a double disc coulter including a pair of plain discs 15 inclined one to the other and in contact, or almost in contact with each other at a single point 16 spaced forwardly of and above the lowermost portions of the discs.

The bracket 14 is rigidly connected to the drag bar 11 and is of a shape that it forms ducts for seed and fertilizer as metered to the opener 13 by a drill and delivered through flexible tubes 17, 18 either of which, dependent on the general arrangement of the drill, may be the seed tube and the other fertilizer tube. The bracket 14 and a construction of the double disc will be described later in more detail.

A second bracket 19 is attached to the drag bar 11 at a position spaced forwardly of the furrow opener 13 and carries a slit-forming device which, in the example of FIG. 1, is a plain disc 20 freely rotatably mounted on a bearing 21 (FIG. 3) supported by a pin 22 carried by the bracket 19. The bracket 19 includes a pair of plates 23, 24 passing one on either side of the drag bar 11 and clamped thereto by bolts 25. Thus, the bracket may be clamped in any desired position along the drag bar 11. Each plate has a series of holes 26 through which the bolts 25 may be passed so that the height of the disc 20 relative to the drag bar 11 may be readily adjusted.

The brackets 23, 24 are each provided with a downwardly and rearwardly sloping front edge 27 so that any trash in front of the bracket is guided downwardly and under it. Similarly the rear edges 27a slope downwards and forwards so that any trash tending to build up to the rear of the bracket is guided into the close proximity of the furrow opener 15 which engages it and pulls it downwardly out of the way.

The drag bar 11 has a pair of lugs 28 having aligned holes 29 through which a pin may be passed so as to form the bearing point for the application of a load to the drag bar 11 to tend to turn it counterclockwise as viewed in FIG. 1. The load may comprise a compression spring.

In FIG. 1 the coulter assembly 10 is shown in the position which it assumes when in operation, the top surface of the ground being indicated by the line 30. In this condition, both the slit-forming disc 20 and the furrow opener 13 are in the ground and, in the case of the double disc opener, the contact point 16 is at about ground level. Under these conditions, the geometry of the arrangement is such that the drag bar 11 inclines rearwardly and upwardly from its point of connection to the cross bar 12.

Since the cross bar 12 acts as the pulling point for the assembly the traction force on the assembly is applied at a relatively low level and it has been found that this results in easier penetration of the assembly as compared with a conventional drill in which the drag bar is inclined downwardly and rearwardly.

In a modification, the disc 20 of FIG. 1 is replaced by a knife 35 as illustrated in FIGS. 4 and 5. In this instance, the knife 35 has a wide body portion 36 extending between the plates 23A, 24A and includes a bushed hole 37 through which a pin 22A is passed. Since the pins 22 and 22A are the same, the same pin can be used for the disc 20 and the knife 35 so that the latter are readily interchangeable. Two blades 38 extend in opposite directions from the body of the knife, and each blade includes a cutting edge 39 terminating in a point 40. The knife body is provided with two sets of holes 41 situated on opposite sides of the hole 37 and on the circumference of a circle having the same center as the hole 37.

Similarly, a set of holes 42 at the same radius as the holes 41, are provided in the bracket 19A in its plates 23A, 24A. The knife 35 may thus be rotated, to select either of the cutting edges, until selected holes 41 and 42 are in alignment to place the selected cutting edge at the required "pitch" to give the best penetration result and to compensate for wear. A pin 43 is then passed through the selected holes 41 and 42, the pin 43 preferably being a shear pin.

In the arrangement shown there are two holes 41 in each set and the distance apart of the holes 41 is different to that of the holes 42 so that four positions of pitch adjustment are obtainable.

FIG. 6 is a diagrammatic plan view of a drill having a plurality of coulter assemblies and a frame 150 supported on ground wheels 151 and having a drawbar 152 for attachment to a tractor. The furrow openers 13 are aligned transversely of the machine and have their centers in the vertical plane defined by the ground wheel centers. The arrangement has the effect of causing the furrow openers to follow ground contour closely upon working engagement with the soil.

Additionally in the drill, the slit-forming discs 20 or the knives 35 are staggered in two rows, adjacent ones being in alternate rows, so as to provide maximum clearance and thus minimize blockage due to build-up of trash. It is primarily for this reason that the brackets 19 are adjustable along the length of the drag bar 11. However, due to the slope of the drag bar 11, this adjustment would cause the slit-forming devices to run at different depths for different positions of adjustment and to correct this they are, as described previously, adjustable also in a vertical direction relative to the drag bar 11. It is also possible to stagger the furrow openers 13 in two rows.

The furrow openers may be of any conventional double disc type in which two freely rotatable discs are inclined at an acute angle to each other with their peripheries just, or almost, touching at a point approximating to ground level when in the working position. One form is illustrated in FIGS. 1, 2 and 7, and includes the U-shaped bracket 14 with the base of the U facing downwardly and attached to the drag bar 11 so that it surrounds two holes 50, 51 therein and forms a continuation of them. A cross member 52 defines with the base of the U a first seed or fertilizer passage in communication with the hole 50 and having an outlet 53. Cross members 54, 55 form a second passage communicating with the hole 51 and having an outlet 56. At its lower end, the bracket 14 is rigidly attached to and provides a support for a central hub portion 57 of the opener. Two spindles 58, making an obtuse angle with each other, extend in opposite directions from the hub 57 and each carries one of the discs 15.

Each disc 15 is mounted in the same manner on its associated spindle 58, and it is therefore only necessary to consider the right hand disc as viewed in FIG. 7. A bearing 60 having a conical outer surface 61, is slidably received on the spindle 58 and is prevented from rotation by a pin 62 extending through the spindle and engaging slots 64 in the bearing 60.

The outer end of the bearing 60 is formed with an enlarged hole 65 into which a spring 66 encircling the spindle 58 is inserted so as to bear against the base of the hole. The other end of the spring 66 bears against the flange 68 removable mounted on the spindle 58. Thus, the spring 66 resiliently urges the bearing 60 inwardly towards the hub portion 57.

The disc 15 is riveted to a bearing 70 having an inner conical hole 71 adapted to register with the outer conical face 61 of the bearing 60. The disc 15 is therefore free to rotate about the stationary bearing 60 and is also urged by the spring 66 inwardly towards the hub 57.

A spacer 73 is bolted to the cross member 55 of the bracket 14 and extends between the discs 15 at the point where they are farthest apart. The sapcer 73 is adjustable radially to a position so that it has two surfaces 74 touching the inside edges of the discs 15 when the diammetrically opposite points are in contact in the manner described previously.

Due to the resilient mounting of the discs, they are automatically maintained in correct adjustment relative to each other and, furthermore, in the event that a stone or other obstacle is encountered, they are able to move apart to negotiate the obstacle.

In operation of the coulter assembly, the disc 20 or knife 35 first makes a slit in the ground and cuts through any trash which may be lying on the top of the ground.

The furrow opener 13 then opens up the slit and the seed is deposited in the resulting furrow. Under some conditions, it is desirable to close the furrow or compact the seed bed after the seed has been depositd in it. Also it may sometimes be desirable to provide a separate depth control means on each coulter assembly. For this purpose, a press or depth control wheel 77 as shown in FIGS. 8 and 9 may be provided. The wheel 77 is mounted on a bracket 78 having a cranked central portion 79 and upper and lower parallel portions 80, 81. The upper portion 80 is provided with a series of holes 82, bolts 83 being passed through selected holes so as to clamp the bracket 78 at its required height of adjustment. A stub axle 84, carrying a bearing 85 is secured by a bolt 86 to the lower portion 81 of the bracket 78. The press wheel 77 is secured through bolts 87 to a flange 88 rotatably mounted on the bearing 85.

In the example shown in FIG. 9, the press wheel 77 is cylindrical and has a flat outer periphery 90 the center of which is contained in the vertical plane 91 passing through the drag bar axis so that the wheel is directly behind the furrow opener 13. It may, under some circumstances, be desirable to adjust the position of the wheel laterally relative to the furrow opener and this may be achieved by making any one, or a combination, of the following adjustments:

The bracket 78 may be turned through 180°, or be positioned at the opposite side of the drag bar, or the stub axle 84 may be positioned at the opposite side of the bracket 78 or the wheel 77 may be reversed on the flange 88.

FIGS. 10 to 13 show various alternative wheels which may be used, these all being similar to the wheel 77 and readily interchangeable therewith, the only significant difference being in the shape or construction of the outer periphery.

In FIG. 10, the outer periphery 92 is of frusto-conical shape so that the larger diameter ends tends to enter the ground and push earth toward the furrow for the purpose of closing it.

Figure 11:
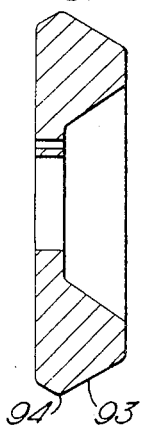
Figure 13:
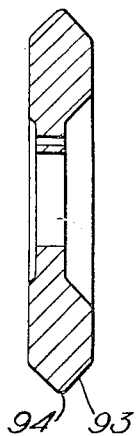

In FIGS. 11 and 13, the outer periphery 93 has a surface which diminishes in diameter to either side of a point 94 of greatest diameter.

Figure 12:

In FIG. 12, the surface 95 of the wheel is of concave form. This information is particularly useful if the wheel is set to run centrally over the slit and obtain good closure thereof.

Figure 14:
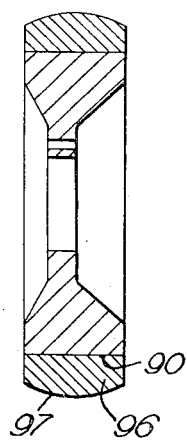

In FIG. 14, the wheel is similar to that shown in FIG. 8, but the outer periphery 90 has bonded to it a rubber ring 96 which may have its outer periphery of a shape similar to that of the wheels shown in FIGS. 8 and 10 to 13, or a convex outer periphery 97 as shown in FIG. 14.

What is claimed is:

1. A seed drill comprising a frame, at least one drag bar with its forward end pivotally connected to the frame of the drill on a horizontal axis transverse to the direction of travel of the drill, said drag bar extending generally rearwardly and upwardly relative to the direction of travel of the drill from the pivotal connection, a rotatable disc for forming a slit in the soil mounted in a vertical plane on the drag bar to the rear of the pivotal connection, means to vertically adjust the rotatable disc for forming a slit in the soil relative to the drag bar, means to vary the location of the disc for forming a slit in the soil along the length of the drag bar, a furrow opener mounted on the drag bar to the rear of the disc for forming a slit in the soil, said furrow opener including two rotatable discs, means attached to the drag bar forming at least one passage to guide seed between the discs of the furrow opener, a press wheel mounted on the drag bar to the rear of the furrow opener, and mounting means for vertically adjusting the press wheel relative to the drag bar to control the depth of the furrow formed by the furrow opener.

2. A seed drill according to claim 1, in which the two discs comprising said furrow opener are inclined one to the other and substantially in contact with each other at a single point spaced forwardly of and above the lowermost portions of the discs when in operating position.

3. A seed drill according to claim 2, in which the discs of the furrow opener are spring urged towards each other.

4. A seed drill according to claim 2, further comprising a spacer which extends between the furrow opener discs at the point where they are farthest apart, said spacer being secured to a member fixed relative to said drag bar.

5. A seed drill according to claim 4, in which said spacer is adjustable radially of said furrow opening discs to a position in which end portions of the spacer touch the inside edges of the discs when the latter are in contact at said single point.

6. A seed drill according to claim 1, further comprising a plurality of said drag bars disposed transversely of the drill frame, said frame having at least one ground wheel supporting each side.

7. A seed drill according to claim 6, in which said furrow openers are aligned so as to have their centers in a substantially vertical plane common to the ground wheel centers.

8. A seed drill according to claim 6, in which a plurality of said means for forming a slit in the soil are disposed in two rows, adjacent means being in alternate rows so as to minimize blockage due to build-up of ground surface trash.

9. A seed drill according to claim 1, in which said press wheel is directly behind and in line with said furrow opener.

10. The seed drill of claim 1 wherein said drag bar includes lug means for the application of a load to hold the furrow openers in the soil.

References Cited

UNITED STATES PATENTS

| | | | |
|---|---|---|---|
| 271,844 | 2/1883 | Hanson | 172—741 X |
| 1,937,428 | 11/1933 | Keefe | 172—744 X |
| 2,299,381 | 10/1942 | Collins | 172—164 |
| 2,318,561 | 5/1943 | Silver | 111—59 |
| 2,416,403 | 2/1947 | Paul | 111—59 |
| 2,739,519 | 3/1956 | Pledger et al. | 172—741 |
| 1,046,221 | 12/1912 | Rieske | 111—88 |
| 2,668,490 | 2/1954 | Oehler et al. | 111—85 X |
| 2,754,622 | 7/1956 | Rohnert | 111—85 X |
| 2,887,075 | 5/1959 | Linkogel | 111—85 X |
| 2,902,954 | 9/1959 | Stilwell | 111—52 |
| 452,245 | 5/1891 | Szarkowski. | |
| 520,363 | 5/1894 | Kirven | 172—703 X |
| 546,535 | 9/1895 | Horscroft | 111—71 X |
| 736,369 | 8/1903 | Dynes et al. | 111—88 |
| 1,107,224 | 8/1914 | Perrine | 111—85 X |
| 1,150,537 | 8/1915 | Roby | 111—85 X |
| 1,204,239 | 11/1916 | Bozard | 111—88 |
| 1,281,873 | 10/1918 | Swiggart | 111—85 X |
| 1,286,268 | 12/1918 | Fifield | 172—575 |
| 1,590,916 | 6/1926 | Stromatt | 172—165 |
| 1,922,219 | 8/1933 | Schumann | 172—149 X |

FOREIGN PATENTS 23,120   3/1918   Denmark.

ROBERT E. PULFREY, Primary Examiner

A. E. KOPECKI, Assistant Examiner

U.S. Cl. X.R.

111—86; 172—575, 604